March 16, 1965   P. L. SCHOONOVER   3,173,663
MATERIAL MOVEMENT
Filed June 3, 1963   2 Sheets-Sheet 1
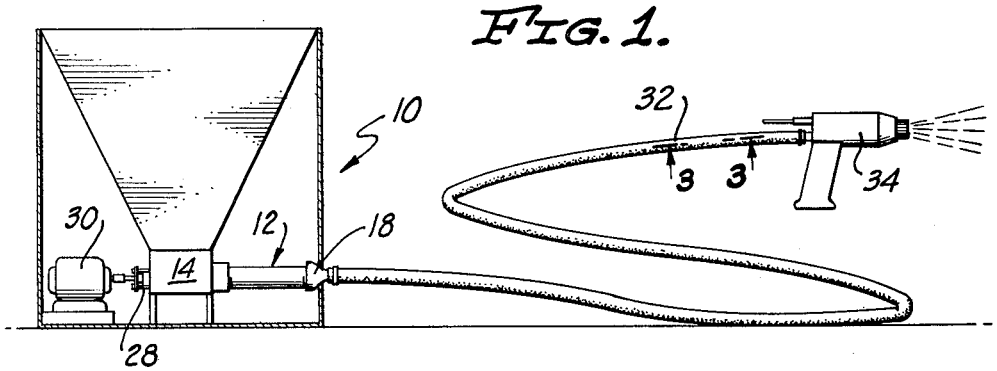
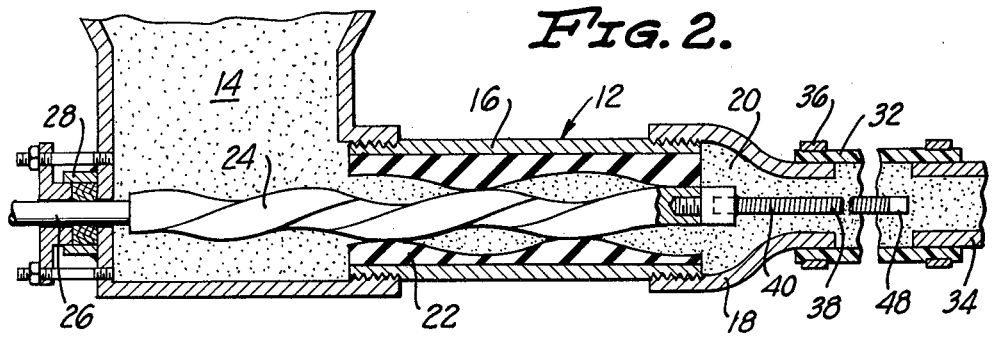
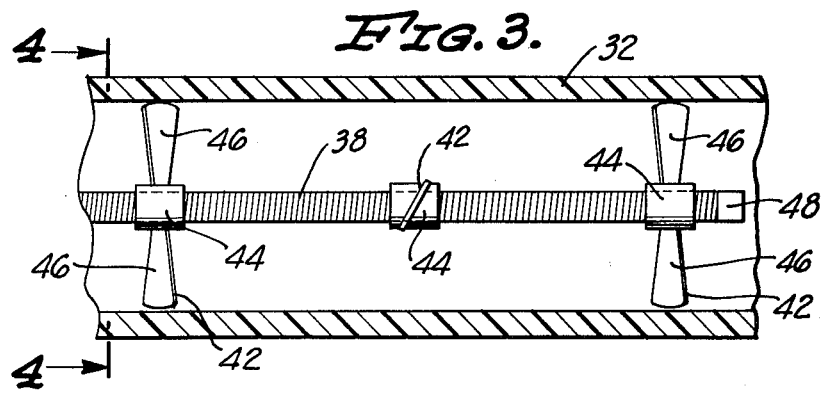
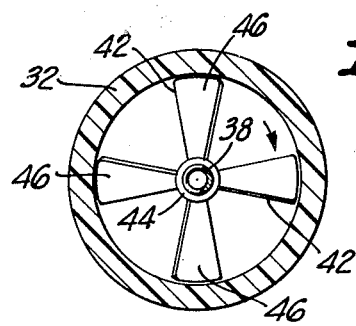
INVENTOR.
PAUL L. SCHOONOVER
BY
EDWARD D. O'BRIAN
ATTORNEY

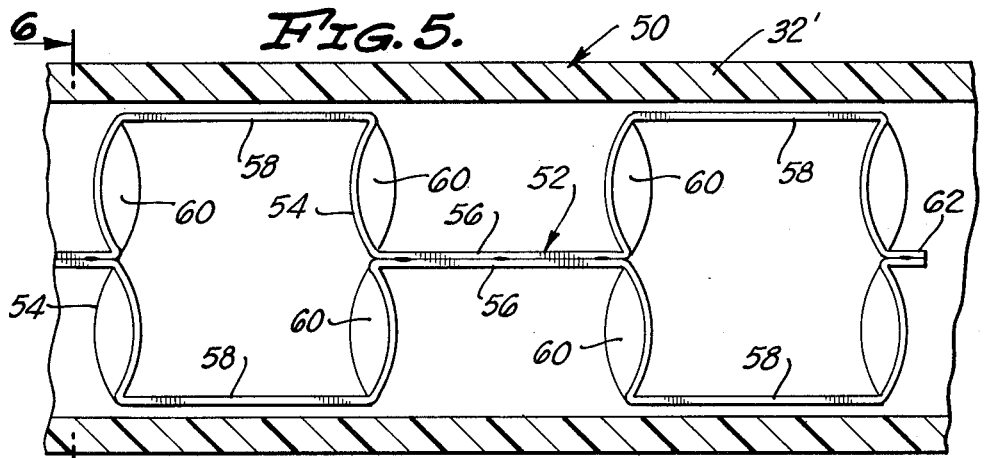
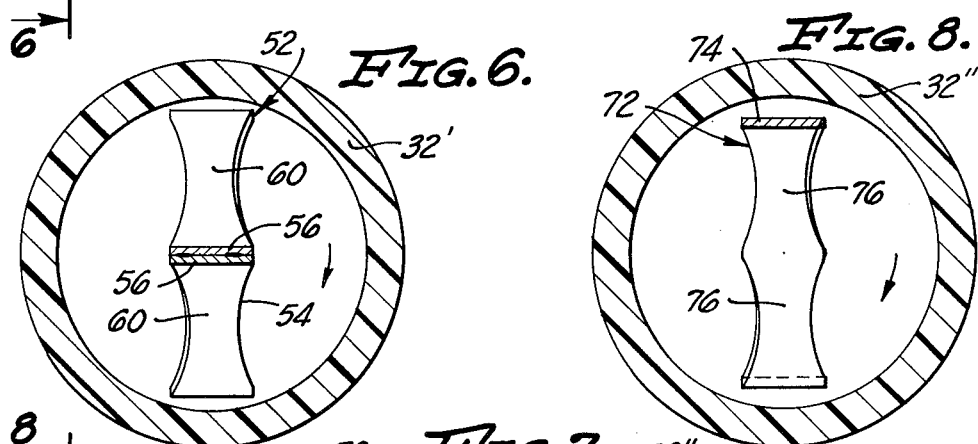
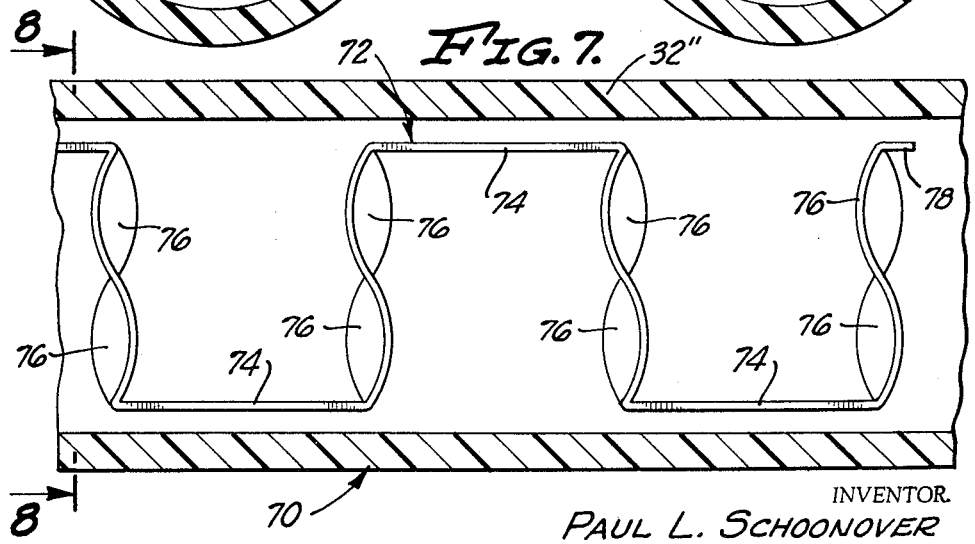

United States Patent Office 3,173,663
Patented Mar. 16, 1965

3,173,663
MATERIAL MOVEMENT
Paul L. Schoonover, Sherman Oaks, Calif., assignor to Monolith Portland Cement Company, Los Angeles, Calif., a corporation of Nevada
Filed June 3, 1963, Ser. No. 285,558
6 Claims. (Cl. 259—5)

This invention pertains to the field of material movement. More specifically it relates to new and improved apparatus for moving and handling bulk quantities of granular materials and slurries. It also relates to new and improved methods for moving and handling such material.

Because of economic and other considerations a great many efforts are presently being made at developing equipment which can be used so as to pump bulk quantities of granular materials such as cement through elongated conduits of various types. A great deal of work is also being directed to the problem of moving slurries through such conduits under such conditions that the slurries do not tend to separate out into their components. The problems in both of these fields are considered to be directly related. Much of the equipment which has been developed already for the handling of bulk quantities of granular material is also capable of being used in the handling of slurries.

One of the major problems in pumping or forcing a granular material or a slurry through an elongated conduit is the problem of internal friction and resistance to flow encountered within the conduit. Thus, for example, it is possible to pump or force granular Portland cement or a refractory type mixture into one end of a conduit through the use of an existing pump. Such a pump will frequently be incapable of moving such a granular material or a slurry through the entire length of the conduit because of the internal friction within it. This term "internal friction" as used herein is employed in more of a descriptive than a technical sense, and is intended to encompass a wide variety of different effects such as abrasion, flow coefficients and the like which are encountered in the movement of a material through a conduit.

A broad object of the present invention is to provide new and improved apparatus for moving bulk quantities of granular materials and/or slurries through both rigid and flexible conduits. A related object of this invention is to provide new and improved methods for accomplishing such movement. A further related object of this invention is to provide apparatus as herein described which may be constructed at a comparatively nominal cost, which may be easily utilized for its intended purpose, and which is capable of performing satisfactorily for a prolonged period. Another object of this invention is to provide methods as herein described which may be easily and conveniently carried out at a comparatively nominal cost.

Another object of this invention is to provide methods and apparatus for handling slurries so as to prevent such slurries from segregating into fractions of different compositions. A still further object of this invention is to provide methods and apparatus for handling slurries and bulk quantities of granular materials which are capable of being practiced and used in most cases without the introduction of various flow aiding additives such as air, viscosity reducing agents or the like.

These and various other objects of this invention as well as many specific advantages of it will be more fully apparent from a detailed consideration of the remainder of this specification, the appended claims and the accompanying drawings in which:

FIG. 1 is a side elevational view of an apparatus of the present invention;

FIG. 2 is a partial cross sectional view taken in a vertical plane showing part of the apparatus illustrated in FIG. 1;

FIG. 3 is a cross sectional view taken at line 3—3 of FIG. 1;

FIG. 4 is a cross sectional view taken at line 4—4 of FIG. 3;

FIG. 5 is a view corresponding to FIG. 3 of a modified embodiment of an apparatus of this invention;

FIG. 6 is a cross sectional view taken at line 6—6 of FIG. 5;

FIG. 7 is a view corresponding to FIG. 3 of a further modified embodiment of an apparatus of this invention; and FIG. 8 is a cross sectional view taken at line 8—8 of FIG. 7.

The accompanying drawings are primarily intended so as to clearly illustrate several differently constructed presently preferred embodiments or forms of this invention. Those skilled in the field of material handling will realize that the basic features or principles of this invention as described in this specification and as embodied within the structures illustrated can be applied in the creation of a number of types of different apparatus through the use or exercise of routine engineering skill or ability. Such individuals will also realize that the appended claims define these features or principles.

As an aid to understand this invention it may be stated in essentially summary form that it concerns the movement of material through an elongated rigid or flexible conduit through the use of an elongated flexible member extending through at least a functionally significant length of the conduit. In practicing the present invention this flexible member is constantly rotated within the interior of the conduit as either a granular material or a slurry is forced through the conduit from one end of it. With various embodiments of this invention the flexible member carries means which serve to exercise a pumping action during the rotation of the flexible member. This type of pumping action aids the movement of the material through the conduit and serves to continuously agitate the material in the conduit so as to prevent any tendency towards stratification or settling.

The actual details of the present invention will be more fully apparent from a detailed consideration of the accompanying drawings. In FIGS. 1–3 of the drawings there is illustrated an apparatus 10 of the present invention which utilizes a conventional pump 12 having an inlet chamber 14 leading to one end of a tubular rigid housing 16. This housing 16 is attached to the chamber 14 so as to extend directly from it; a reducer type fitting 18 is attached to the extremity of the housing 16 remote from the chamber 14 and serves to define an outlet chamber 20. Within the interior of the housing 16 there is located an elastomeric stator 22. This stator extends around a rigid pump rotor 24 which extends completely through the housing 16 and across the inlet chamber 14. The rotor 24 is attached to an aligned shaft 26 extending through a bearing 28 mounted on the chamber 14. This shaft 26 is turned by a conventional electric motor 30 during operation of the pump 12. The construction of the pump 12 is essentially of a conventional, known type. A pump of this general type is shown in the Bourke et al. U.S. Patent No. 2,924,180.

The pump 12 is used to force either a granular material or mixture or a slurry through an elongated conduit 32 during the operation of the apparatus 10. Preferably this conduit 32 is flexible and is formed of a comparatively heavy wall natural or synthetic rubber composition; it may or may not be reinforced in various conventional manners. If desired a conventional spray gun 34 may be secured to the end of it remote from the fitting 18. Such a spray gun 34 need not be used when the complete apparatus 10 is being used so as to move material into a bin or similar storage area or into concrete forms or the like. One end of the conduit 32 is preferably secured to the fitting 18 by a conventional clamping band 36 or in another equivalent manner.

Within the interior of the conduit 32 there is located an elongated flexible coil spring 38 which extends virtually the entire length of the conduit 32; an end 40 of this spring 38 extends into the outlet chamber 20 and is directly secured to an end of the rotor 24 as by welding or other equivalent techniques. The spring 38 is of much smaller diameter than the interior of the conduit 32, and is coiled in such a manner that as the rotor 24 is rotated in a conventional manner so as to achieve a pumping action this spring 38 becomes tightened.

At periodic, preferably equally spaced intervals, along the length of the spring 38 within the interior of the conduit 32 a plurality of small propellers 42 are secured to this spring 38 by an adhesive (not shown) or other equivalent manners. Each of these propellers 42 includes a hub 44 positioned around the spring 38 and at least two blades 46 "balanced" so as to be capable of exercising a pumping and agitating action about the spring 38 as this spring is rotated through the rotation of the rotor 24. Although the propellers 42 can be made out of virtually any material, it is presently preferred to manufacture them so that at least the blades 46 are of a relatively rigid yet somewhat flexible material such as a known polyurethane resin which will not abrade the interior of the conduit 32 to any significant or noticeable extent. In the apparatus 10 these propellers 42 are needed to the greatest extent at points remote from the pump 12 where the "internal friction" of the material moving through the conduit 32 causes a decrease in the pumping action of the pump 12.

The operation of the apparatus 10 is essentially very simple. Either a granular material, a mixture of a granular material and a small quantity of air, or a solid liquid slurry is located within the inlet chamber 14 as the pump 12 is operated. Such operation causes such material to be moved from the pump 12 through the conduit 32. As the material handled in this manner moves through the conduit the action of the propellers 42 will cause a further pumping action and a constant agitation and mixing of the material within the conduit 32. This in turn will facilitate the movement of material through this conduit.

The collapse or kinking of the conduit 32 during the use of the apparatus 10 is effectively prevented by the presence of the spring 38 and the propellers 42 since these elements prevent the conduit 32 from being bent so as to completely impede the movement of the material through the conduit. However, because of the flexible character of the spring 38 the conduit 32 can be bent or deformed so as to follow virtually any desired path during its operation. In order to achieve this flexibility it is considered necessary to have an end 48 of the spring 38 remote from the pump 12 substantially free and unattached to any structure.

In FIG. 5 of the drawings there is shown a modified apparatus 50 of this invention which is very similar to the apparatus 10 previously described. In the interest of brevity those parts of the apparatus 50 which are the same as or substantially the same as various parts of the apparatus 10 are not separately indicated herein, and are shown both in the drawings and are described in this specification where necessary to an understanding of the apparatus 50 by the primes of the numerals previously used to describe such parts.

In the apparatus 50 the spring 38 and the propellers 42 are replaced by an elongated flexible spring or similar steel strip band 52 of smaller diameter than the conduit 32' which in the interest of ease of manufacture is in actuality composed of two separate steel bands 54. These bands 54 are formed so as to each have periodic equally spaced flat central sections 56 and periodic parallel flat side sections 58. These sections being connected by sloping blade sections 60. The central sections 56 are preferably secured to one another by welding or other equivalent techniques, so that the blade sections 60 extend from them in essentially the manner in which the blades of a propeller extend from a hub. Two of the central sections 56 are preferably secured to the rotor of the pump, such as rotor 24 of pump 12, by welding or other similar techniques.

The operation of the apparatus 50 is essentially similar to the operation of the apparatus 10. As the pump 12 is operated the composite band 52 is rotated about an axis corresponding to the location of the central section 56. As the conduit 32' is bent to a desired configuration the central section 56 will deform so as to follow the configuration of this conduit. Preferably the composite band 52 extends substantially the entire length of the conduit 32 and is provided with an end 62 which is free within the conduit 32 and so as to achieve an effective pumping action and so as to permit the conduit 32' to be located in any desired manner.

In FIGS. 7 and 8 of the drawings there is shown a further modified apparatus 70 which is also very closely related to the apparatus 10 previously described. In the interest of brevity those parts of the apparatus 70 which are the same or substantially the same as various parts of the apparatus 10 are not separately indicated herein. Such parts are shown in the drawings and are designated in this specification where necessary for an understanding of the apparatus 70 by the double primes of the numerals previously used to describe such parts.

In the apparatus 70 the spring 38 and the propellers 42 used in the apparatus 10 are replaced by a single flexible spring steel or similar band or strip 72 which is formed so as to have parallel flat side sections 74 connected by twisted transverse walls 76. These walls 76 are twisted so as to generally resemble the blades of a propeller. The center of one of the walls 76 is secured to the end of the rotor, such as rotor 24, as by welding or similar techniques. The distance between the side sections 74 is of course less than the interior diameter of the conduit 32", but is preferably great enough so that the band 72 turns on an axis roughly extending through the midpoints of the walls 76 as the pump, such as pump 12, is operated. This band 72 preferably terminates at an end 78 which is unattached within the interior of the conduit 32" and also preferably extends substantially the entire length of this conduit.

The utilization of the apparatus 70 is essentially the same as the utilization of the apparatus 10 and the apparatus 50. As the pump is operated the rotor of this pump will cause rotation of the band 72. Such rotation will result in the band 72 exerting an agitating and pumping action. Because of the flexibility the band 72 will permit the conduit 32' to bend or deform to virtually any desired shape, and yet this band 72 will effectively prevent any collapsing or kinking of this conduit.

From a careful consideration of the preceding it will be seen that the apparatus 10, 50 and 70 are relatively simple, effective devices which are capable of being used in moving bulk quantities of granular materials with or without air entrained in such materials and which are capable of effectively moving slurries of a wide variety of types without the materials within such slurries settling out. Because of the nature of the apparatus they are capable of being employed with Portland cement and related granular materials such as refractories or refractory compositions of various types. They are also capable of being used in conveying slurries of Portland cement and water being used to form concrete and in conveying various types of food or other products.

It will be seen from the aforegoing that the principles of this invention can be utilized in a number of differently appearing structures, and that a number of differently appearing structures and a number of different types of elongated, flexible members may be employed in order to achieve the effects or results described in this specification. Both of the apparatuses herein described are considered to be particularly adapted for use in conveying mixtures of cement, sand and water in processes for spraying such mixtures upon an appropriate surface in order to create a concrete structure. In utilizing the method inherent in the operation of both of the apparatuses shown it is possible to use conventional concrete in such mixtures instead of concrete which has additives, such as asbestos. As a consequence of this, cost savings are possible through the utilization of the present invention.

Because of the nature of this invention it is to be considered as being limited only by the appended claims forming a part of this disclosure.

This application discloses similar subject matter to that set forth in the United States Letters Patent No. 3,093,364 granted to the same inventor on June 11, 1963 and entitled "Apparatus and Method for Conveying Slurry."

I claim:
1. An apparatus for material movement which includes:
   pump means having an inlet and an outlet and a rotor extending towards said outlet;
   an elongated flexible conduit having a wall and having ends, one of said ends being attached to said outlet so as to extend therefrom, said end of said conduit attached to said outlet being aligned with said rotor;
   an elongated, unitary, flexible member having first and second ends, said first end of said flexible member being attached to said rotor to rotate therewith, said flexible member extending from said rotor through substantially the entire length of said conduit, said second end of said flexible member being free and unsupported and being located within said conduit, said member being capable of being bent in the same manner as said conduit;
   said elongated, unitary, flexible member being formed of material having a substantially greater width than thickness, said flexible member being formed with sections extending along the length of said conduit and with blade sections extending in a direction across said conduit, said blade sections being capable of pumping and agitating material within said conduit during rotation of said rotor of said pump means.

2. The apparatus for material movement of claim 1 wherein said elongated, unitary, flexible member comprises at least two elongated flexible strips of material having a substantially greater width than thickness, each of said flexible strips of material having a plurality of sections extending along the length of said conduit, alternate sections of said plurality of sections being positioned adjacent the wall of said conduit and the remaining sections extending along the length of said conduit being positioned adjacent and being secured to each other, said blade sections being integral with said sections extending along the length of said conduit.

3. The apparatus for material movement in accordance with claim 1 wherein said elongated, unitary, flexible member comprises a single strip of material which has a width substantially greater than its thickness, said blade sections connected between said sections extending along the length of said conduit each being formed so as to provide two propeller surfaces.

4. An apparatus for conveying a slurry mixture which includes:
   slurry pump means having an inlet and an outlet and a rotor extending toward said outlet;
   an elongated flexible hose having first and second ends, said first end of said flexible hose being attached to said outlet so as to extend therefrom, said first end of said hose being aligned with said rotor, said flexible hose having an interior surface; and
   an elongated, unitary, flexible member having first and second ends, said first end of said flexible member being attached to said rotor so as to extend therefrom and to be rotated thereby, said member extending through substantially the entire length of said hose, said second end of said member being free and unsupported and being located within said hose, said elongated, unitary, flexible member being capable of being bent in the same manner as said hose, said flexible member being formed of material having a substantially greater width than thickness, said flexible member having sections extending substantially parallel to said wall of said hose and blade sections extending in a direction across said hose and connecting said sections extending parallel to said wall, said blade sections being so formed that when said rotor of said pump means is rotated and said flexible member is rotated thereby within said hose, said blade sections are adapted to propel slurry through said hose from said first end toward said second end.

5. The apparatus for conveying slurry as defined in claim 4 wherein said elongated, unitary, flexible member comprises first and second strips of material, each of said first and second strips of material having a greater width than thickness, each of said strips of material being formed with sections extending parallel to said wall adjacent said wall and sections extending parallel to said wall away from said wall, said sections of each of said strips extending parallel to said wall and away from said wall being adjacent to each other and secured to each other, said blade sections being positioned between said sections adjacent said wall and said sections away from said wall.

6. The apparatus for conveying a slurry mixture is defined in claim 4 wherein said elongated, unitary, flexible member comprises a single strip of material having substantially greater width than thickness, said flexible member being formed of a single strip of material having sections extending substantially parallel to said wall of said flexible hose and propeller sections extending between said parallel sections, said propeller sections each providing two surfaces adapted to engage and propel a slurry mixture within said flexible hose.

References Cited by the Examiner
UNITED STATES PATENTS 2,793,279   5/57   Kaiser.
2,888,128   5/59   Allen.

CHARLES A. WILLMUTH, *Primary Examiner.*